(12) United States Patent
Lin et al.

(10) Patent No.: US 8,702,897 B2
(45) Date of Patent: Apr. 22, 2014

(54) STRUCTURES INCLUDING CARBON NANOTUBES, METHODS OF MAKING STRUCTURES, AND METHODS OF USING STRUCTURES

(75) Inventors: Wei Lin, Atlanta, GA (US); Ching Ping Wong, Berkeley Lake, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 858 days.

(21) Appl. No.: 12/800,934

(22) Filed: May 26, 2010

(65) Prior Publication Data

US 2010/0304101 A1 Dec. 2, 2010

Related U.S. Application Data

(60) Provisional application No. 61/181,029, filed on May 26, 2009.

(51) Int. Cl.
*B32B 7/02* (2006.01)
*B65C 9/25* (2006.01)

(52) U.S. Cl.
USPC .......................................... 156/322; 428/212

(58) Field of Classification Search
USPC .......................................... 156/322; 428/212
See application file for complete search history.

(56) References Cited

U.S. PATENT DOCUMENTS

| 6,203,814 | B1 | 3/2001 | Fisher et al. |
| 6,764,874 | B1 | 7/2004 | Zhang et al. |
| 7,371,696 | B2 | 5/2008 | Jin et al. |
| 2006/0194058 | A1 | 8/2006 | Amlani et al. |
| 2007/0151601 | A1 | 7/2007 | Jung et al. |
| 2007/0172851 | A1 | 7/2007 | Yaniv |

FOREIGN PATENT DOCUMENTS

EP 2061077 A2 * 5/2009

* cited by examiner

*Primary Examiner* — Michael Orlando
*Assistant Examiner* — Daniel Lee
(74) *Attorney, Agent, or Firm* — Thomas | Horstemeyer, LLP

(57) ABSTRACT

Embodiments of the present disclosure include structures including a layer of carbon nanotubes, methods of making structures including a layer of carbon nanotubes, and the like.

12 Claims, 14 Drawing Sheets
(10 of 14 Drawing Sheet(s) Filed in Color)

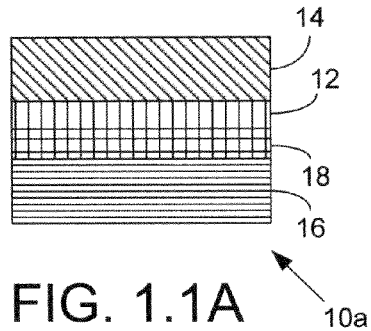
FIG. 1.1A
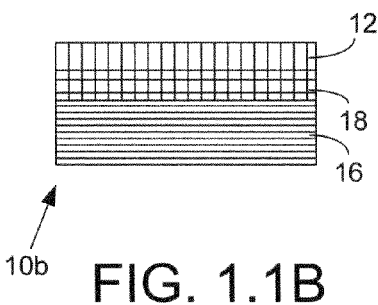
FIG. 1.1B
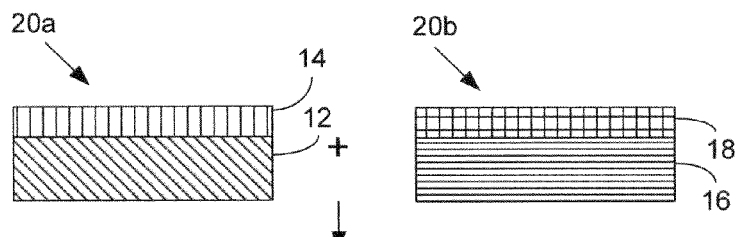
FIG. 1.2A
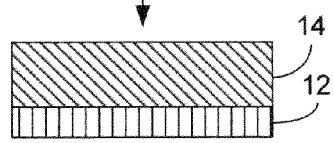
FIG. 1.2B
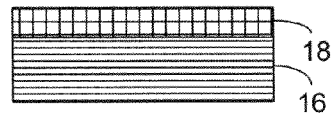
FIG. 1.2C
Optionally ↓
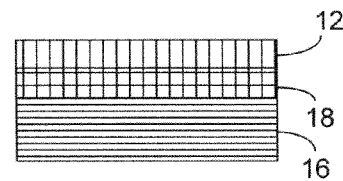
FIG. 1.2D
Optional

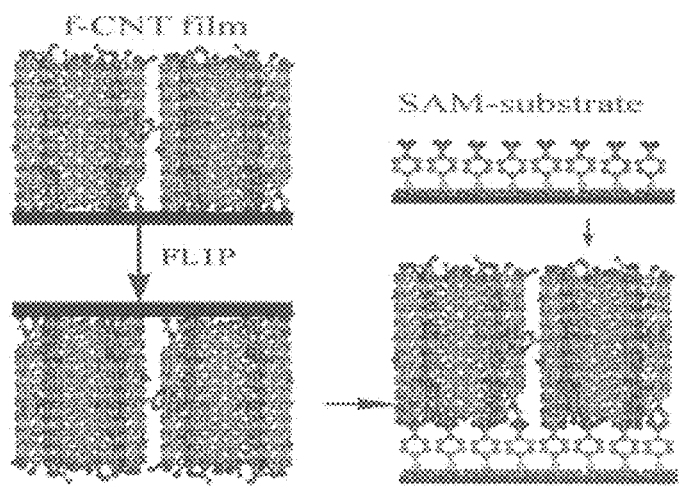
Fig. 2.1
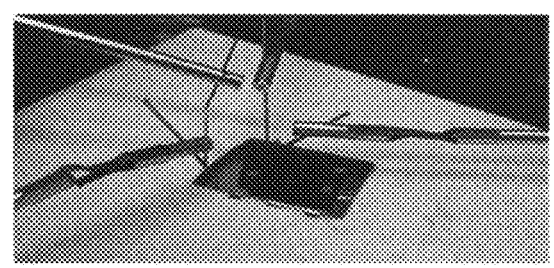
Fig. 2.2

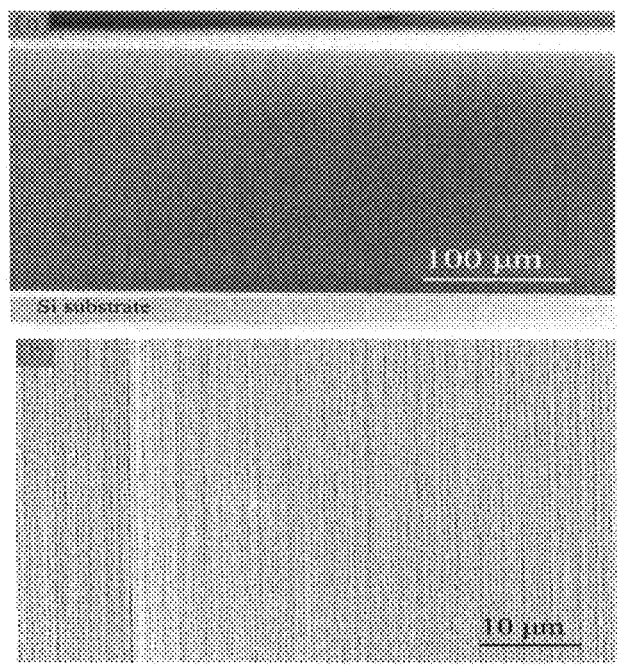
Fig. 2.3

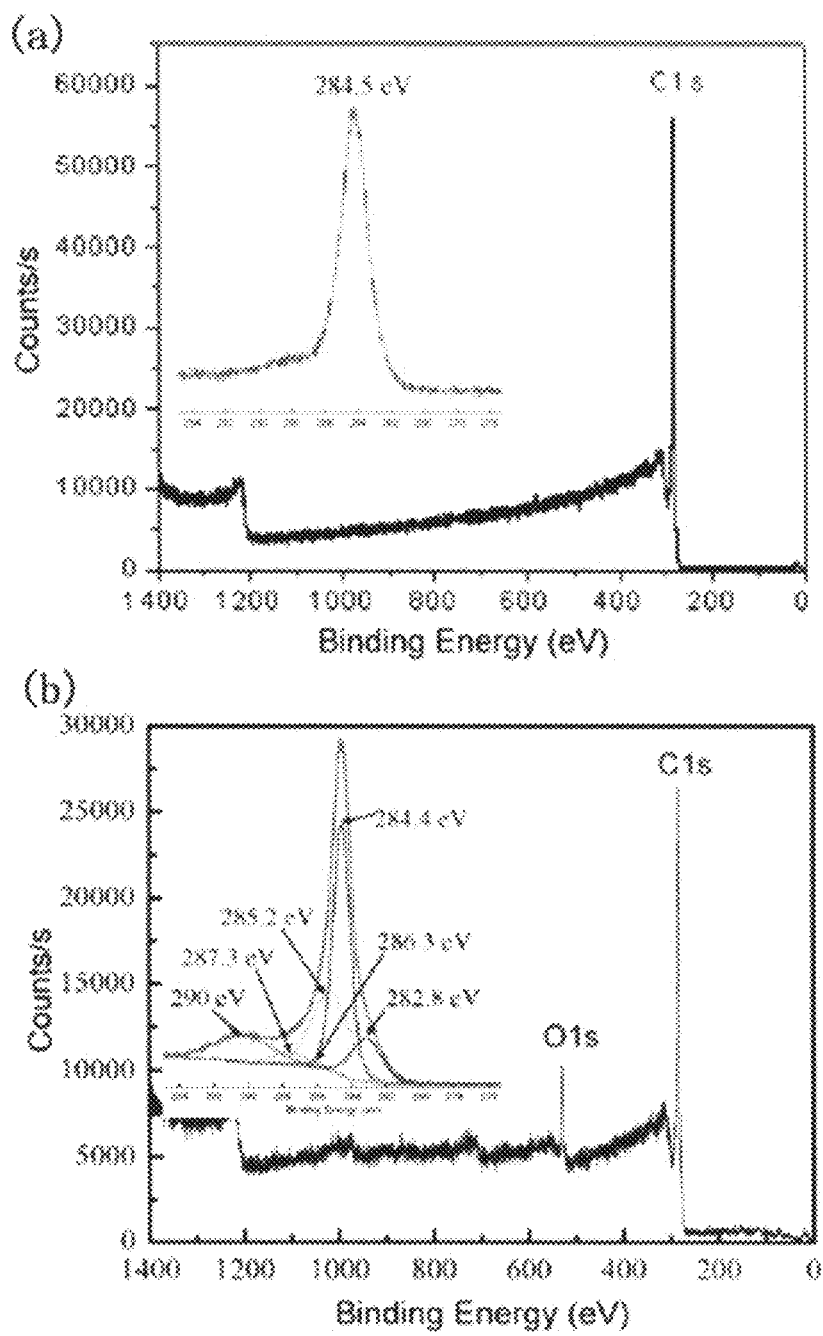
Fig. 2.4

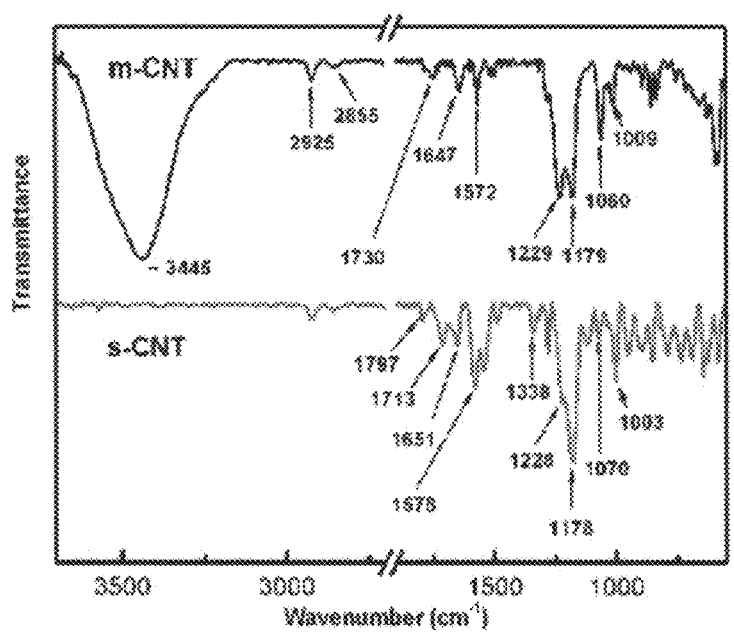
Fig. 2.5
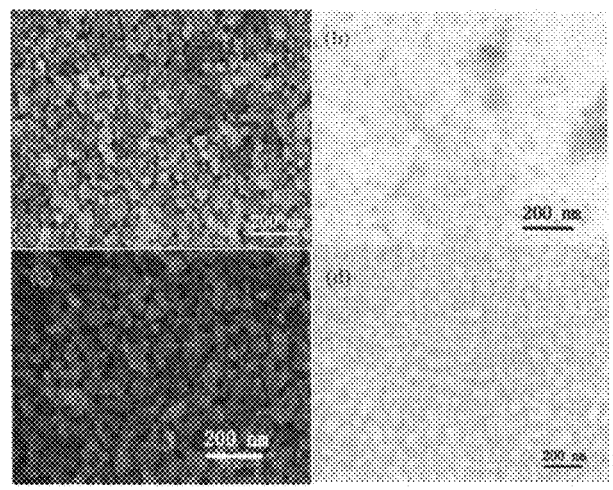
Fig. 2.6

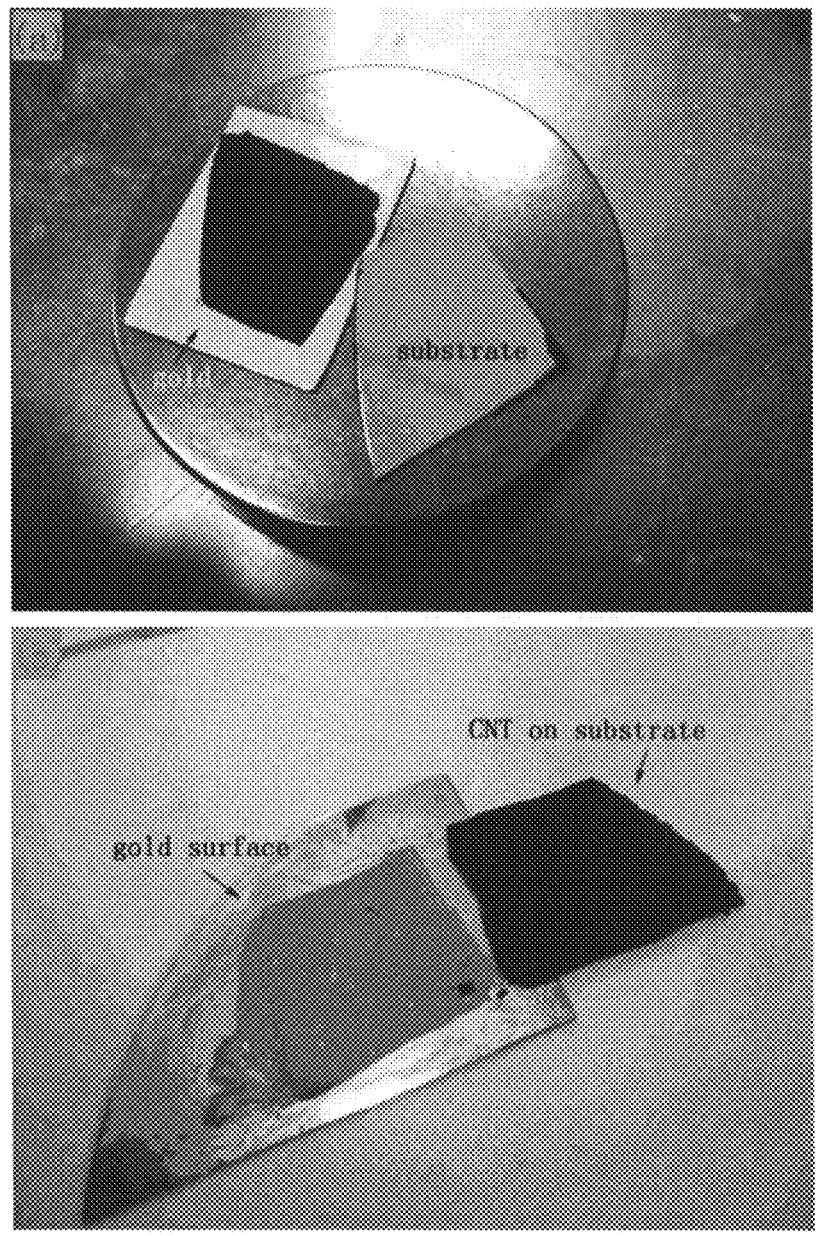
Fig. 2.7

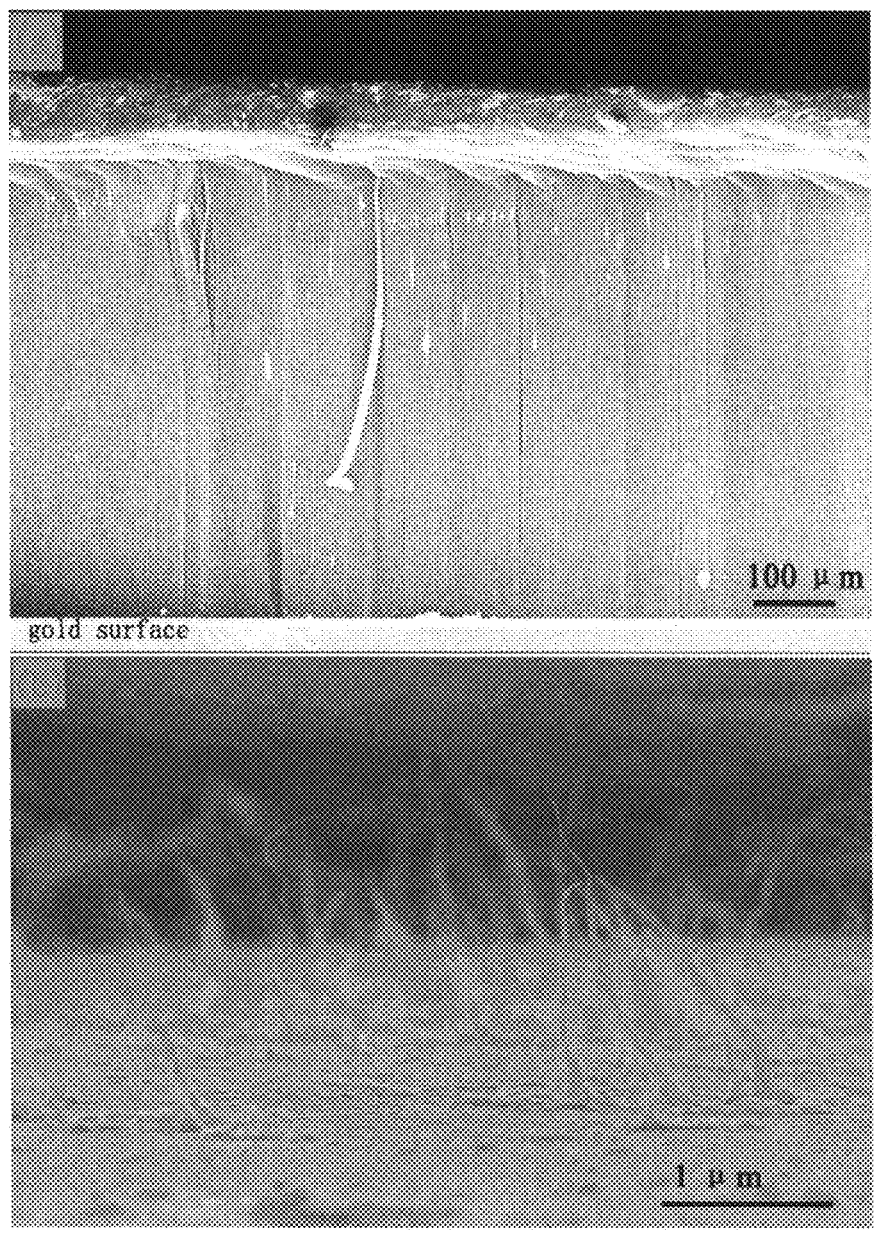
Fig. 2.8

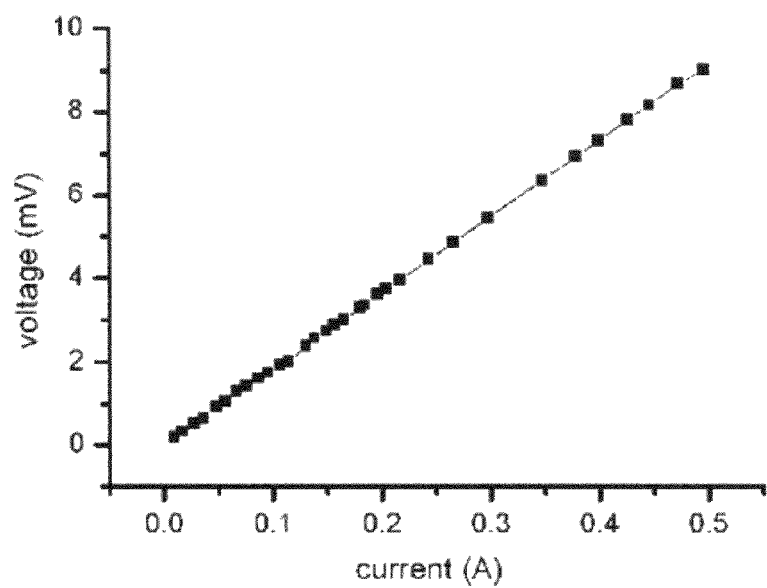
Fig. 2.9

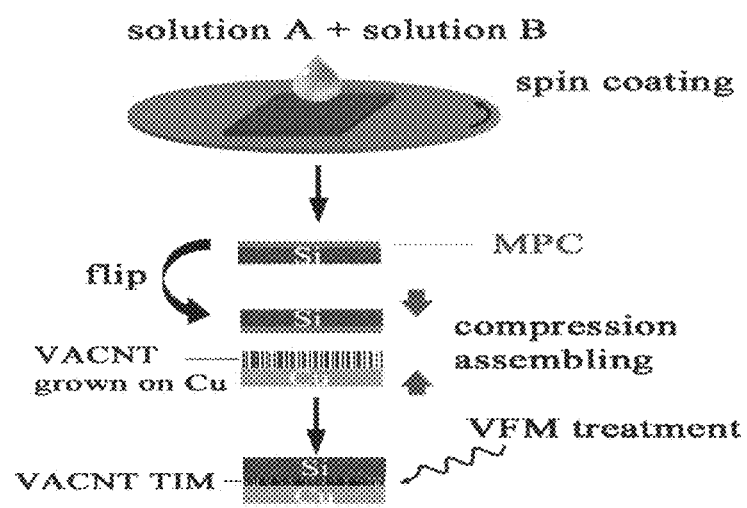
Fig. 3.1

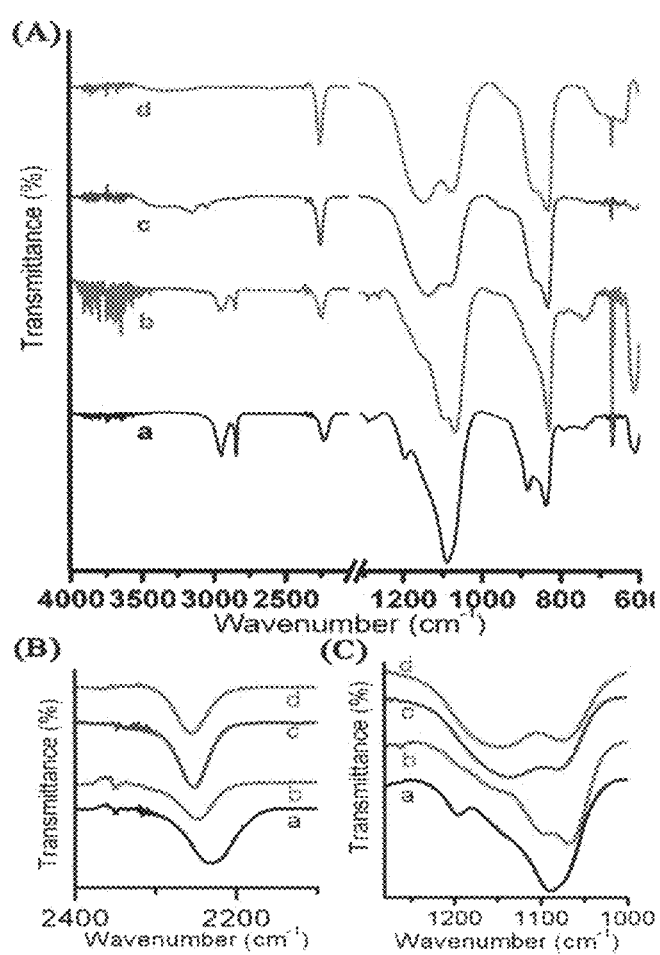
Fig. 3.2

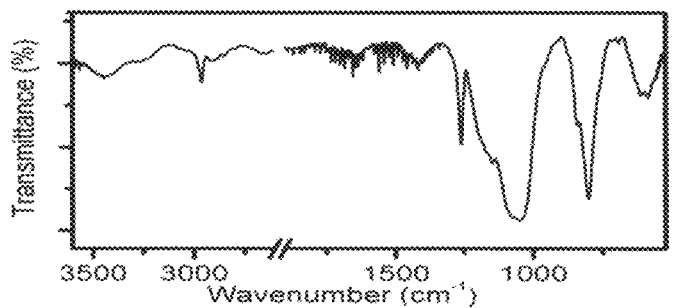
Fig. 3.3
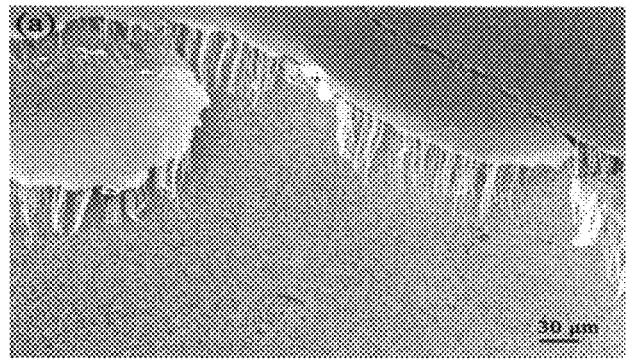
Fig. 3.4A
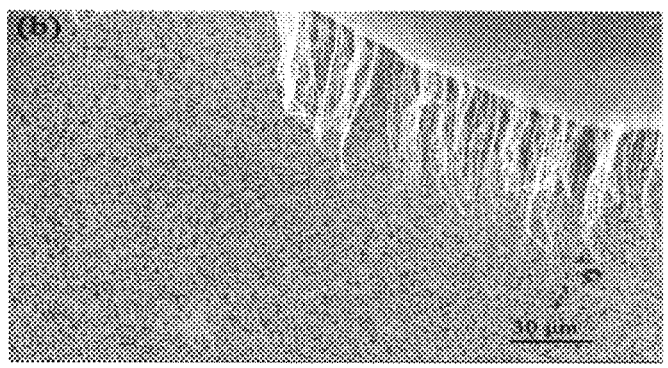
Fig. 3.4B

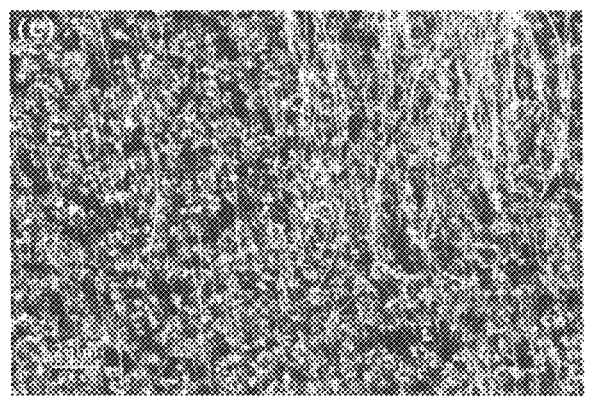
Fig. 3.4C
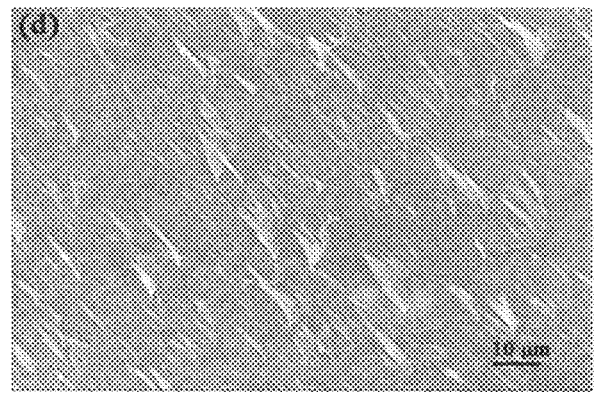
Fig. 3.4D

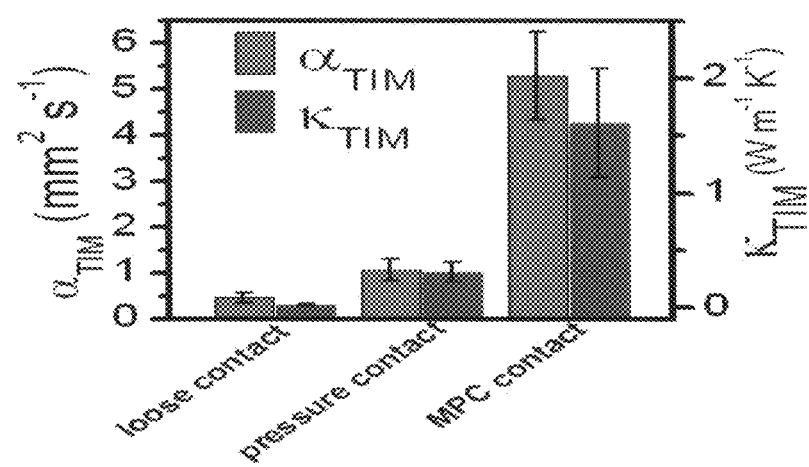
Fig. 3.5

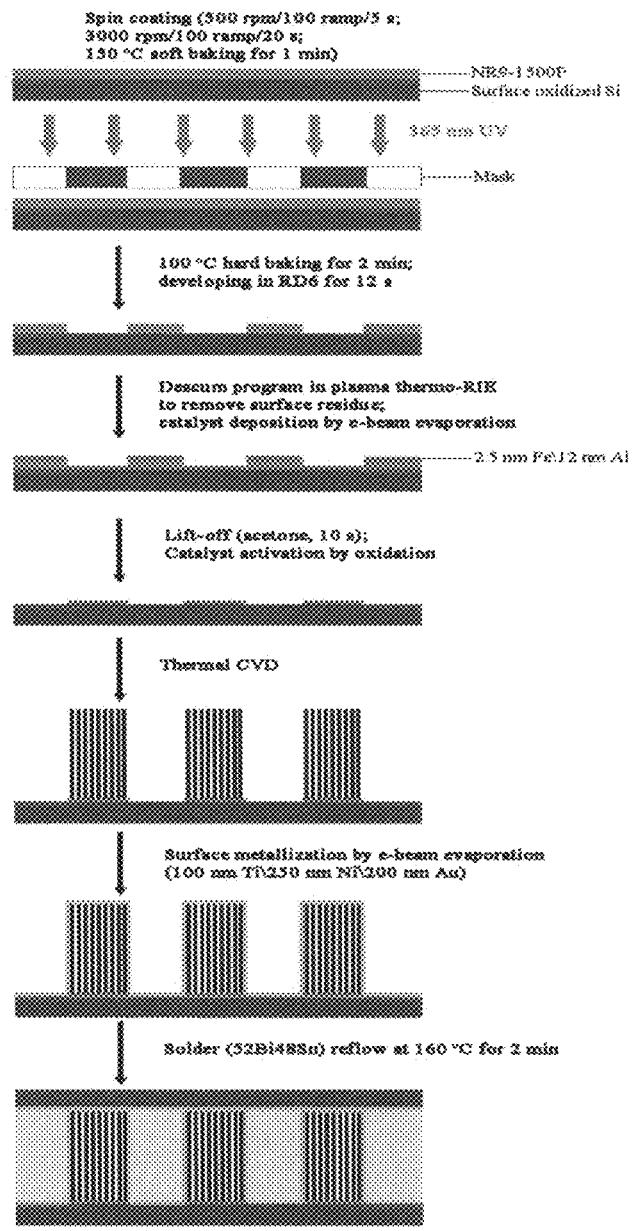
Fig. 4.1

US 8,702,897 B2

STRUCTURES INCLUDING CARBON NANOTUBES, METHODS OF MAKING STRUCTURES, AND METHODS OF USING STRUCTURES

CROSS-REFERENCE TO RELATED APPLICATION

This application claims priority to U.S. provisional application entitled, "Low Temperature Anchoring, of Carbon Nanotube Structures via Chemical Anchoring," having Ser. No. 61/181,029, filed on May 26, 2009, which is entirely incorporated herein by reference.

STATEMENT REGARDING FEDERALLY SPONSORED RESEARCH OR DEVELOPMENT

This invention was made with Government support under Agreement No. DMI-0422553, awarded by the National Science Foundation and Agreement No. RD-83148901-0 awarded by the Environmental Protection Agency. The Government has certain rights in this invention.

BACKGROUND

Revolutionary increases in speed and reliability of microprocessors has been successfully achieved in the past 60 years. The faster and higher performance of microprocessors is based on increased transistor density. As originally proposed, Moore's law stated that the number of transistors in semiconductor devices or integrated circuits (ICs) would double approximately every two years. This prediction has been realized, largely due to device scaling, characteristic of fine pitch interconnects. Copper interconnects are now routinely used with the minimum feature size down to 65 nm; 45-nm node can be found in some commercial devices. However, the electrical resistivity of copper interconnects increases with a decrease in dimensions due to grain-boundary and electron surface scattering. As current density further increases, the electromigration issue for metal interconnects becomes more severe.

In view of these problems, carbon nanotubes (CNTs) have been proposed as a future interconnecting material due to their ultra-high current carrying capacity ($10^9$ A/cm$^2$), thermal stability and high resistance to electromigration. Today, the main challenges of CNT interconnects (circuits) are: 1) purification of metallic or semiconducting CNTs; 2) selective positioning of CNTs; and 3) effective and reliable contacts at CNT junctions. Although the purification issue has almost been addressed by recent development of various CNT separation methods, CNT positioning and contact reliability issues are still unaddressed.

In spite of electrical performances, increasing microprocessor performance is associated with an increased cooling demand; in other words, more efficient heat dissipation is required. It has been reported that a reduction in the device operation temperature corresponds to an exponential increase in reliability and life expectancy of a device. To control device temperature within operation limits is critical. Thermal Design Power (TDP, the maximum sustained power dissipated by the microprocessor) has in the past increased steadily with increasing microprocessor performance. Although multicore microprocessors should alleviate the growth in TDP with increased performance, thermal non-uniformity, usually referred to as the "hot spot" issue, where the local power density could be >300 W/cm$^2$, must be paid more attention to in circuit design and operation. Hot spot issue makes the heat dissipation near the chip more difficult. Effective heat dissipation has become a key issue for further development of high performance semi-conductor devices. Development of novel thermal interface materials (TIMs) is crucial to meet thermal performance requirements for future generations of high-performance IC chips. For thermal management applications, the distinctive thermal properties of carbon nanotubes (CNTs) attract much attention and give rise to new opportunities in thermal management of microelectronic devices and packaging systems. However, CNT/substrate contact resistance at the interface is typically high.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

The patent or application file contains at least one drawing executed in color. Copies of this patent or patent application publication with color drawing(s) will be provided by the Office upon request and payment of the necessary fee.

FIG. 1.1A illustrates an embodiment of the present disclosure.

FIG. 1.1B illustrates an embodiment of the present disclosure.

FIGS. 1.2A to 1.2D illustrates an embodiment for making either of the embodiments shown in FIG. 1.1A and 1.1B.

FIG. 2.1 illustrates a schematic shown an embodiment of the chemical anchoring technology.

FIG. 2.2 is a digital image of a photograph of the four-probe station for electrical property testing of the anchored CNT structure.

FIG. 2.3 is a side view of a typical f-CNT array.

FIGS. 2.4A and 2.4B illustrate XPS spectra of p-CNT (a) and f-CNT (b). Inserted are corresponding C1s spectra.

FIG. 2.5 illustrates FTIR spectra of f-CNT and s-CNT, vertically stacked for comparison.

FIGS. 2.6A-2.6D illustrate SEM images of gold surfaces before and after SAM treatment.

FIGS. 2.7A-2.7B illustrate (a) Successful chemical anchoring of f-CNT onto silicon substrate coated with gold layer; and (b) Anchoring failure of p-CNT.

FIGS. 2.8A and 2.8B illustrate SEM images of chemically anchored CNTs (a) and the interface after the anchored CNTs were wiped off (b)

FIG. 2.9 illustrates I-V curve of the chemically transferred CNT structure measured at room temperature.

FIG. 3.1 is a schematic illustration of the Si/VACNT TIM/Cu assembling process.

FIGS. 3.2A to 3.2C illustrate: (A): FT-IR transmittance spectra of a pure TMS coating (spectrum a), a coating of solution A before fuming in ammonium (spectrum b), a coating of solution A (spectrum c), and a VFM-treated coating of solution A (spectrum d). (B) and (C): enlargement of selected regions in panel (A). Spectra are shifted vertically for clarity.

FIG. 3.3 illustrates an FT-IR transmittance spectrum of TMS-CNT adducts.

FIGS. 3.4A-3.4C illustrates SEM images of MPC-anchored VACNTs at a silicon surface (FIGS. 3.4A-C) and surface status of the silicon mating substrate of a MPC contact assembly after a die shear test (3.4D).

FIG. 3.5 illustrates a comparison of the thermal diffusivities ($\alpha_{TIM}$) and the equivalent thermal conductivities ($\kappa_{TIM}$)

among the loose contact, the pressure contact and the MPC contact VACNT TIM assemblies.

FIG. 4.1 illustrates an embodiment of the present disclosure.

SUMMARY

Embodiments of the present disclosure include methods of forming a structure, structures, and the like, are disclosed. One exemplary method of forming a structure, among others, includes: positioning a first structure adjacent a second structure, wherein the first structure includes a top side and a bottom side, wherein the top side includes a layer of carbon nanotubes, the second structure includes a top side and a bottom side, wherein the top side includes a bonding layer, wherein the top side of each of the first structure and the second structure are adjacent to one another so that the layer of carbon nanotubes contacts the bonding layer; heating the first structure and the second structure in a device; and forming a third structure from the first structure and the second structure wherein a plurality of the carbon nanotubes are covalently bonded to the bonding layer.

One exemplary structure, among others, includes: a growth substrate, a layer of carbon nanotubes, a bonding layer, and a mating substrate, wherein the growth substrate is adjacent the layer of nanotubes, wherein the layer of nanotubes are adjacent the bonding layer on the side opposite the growth substrate, wherein the bonding layer is adjacent the mating substrate on the side opposite the layer of nanotubes, wherein a plurality of the nanotubes are covalently bonded to the bonding layer.

One exemplary structure, among others, includes: a layer of carbon nanotubes, a bonding layer, and a mating substrate, wherein the layer of nanotubes are adjacent the bonding layer, wherein the bonding layer is between the mating substrate and the layer of nanotubes, wherein a plurality of the nanotubes are covalently bonded to the bonding layer.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed. Also, definitions in the publications and patents that are different than those of the present disclosure or are inconsistent with the teaching of the present disclosure are not intended to alter any definitions or meanings of terms or phrases as provided herein or alter any definitions or meanings of terms or phrases that are not consistent with the teachings provided herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

As used herein, the term "adjacent" refers to the relative position of one or more features or structures, where such relative position can refer to being near or adjoining. Adjacent structures can be spaced apart from one another or can be in actual contact with one another. In some instances, adjacent structures can be coupled to one another or can be formed integrally with one another.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure include structures including a layer of carbon nanotubes, methods of making structures including a layer of carbon nanotubes, and the like. An embodiment of the present disclosure addresses at least some interface issues between carbon nanotubes and mating substrates. An embodiment provides various low-temperature approaches to bond carbon nanotubes covalently to various materials to achieve low interfacial electrical and thermal resistances. The approach and material selection can be implemented immediately in areas such as thermal interface materials, electrical interconnects, lithium battery anodes, electrochemical catalysts, high frequency circuits, field emission devices, and the like.

In an embodiment of the present disclosure shown in FIG. 1.1A, the structure 10a includes a growth substrate 14, a layer of carbon nanotubes 12, a bonding layer 18, and a mating substrate 16. The growth substrate 14 is adjacent the layer of nanotubes 12. The layer of nanotubes 12 is adjacent the bonding layer 18 on the side opposite the growth substrate 14. The bonding layer 18 is adjacent the mating substrate 16 on the side opposite the layer of nanotubes 12. A plurality of the nanotubes in the layer of nanotubes is covalently bonded to the bonding layer 18.

In another embodiment of the present disclosure shown in FIG. 1.1B, the structure 10b includes the layer of carbon nanotubes 12, the bonding layer 18, and the mating substrate 16. The layer of nanotubes 12 is adjacent the bonding layer 18 on the side opposite the growth substrate 14 (as in FIG. 1.1A). The bonding layer 18 is adjacent the mating substrate 16 on the side opposite the layer of nanotubes 12. A plurality of the nanotubes of the layer of nanotubes 12 is covalently bonded to the bonding layer 18. The difference between the embodiments shown in FIG. 1.1A and FIG. 1.1B is that the growth substrate 14 has been removed.

The bonding of the plurality of the nanotubes to the bonding layer 18 creates a nanotube interface that can function to provide an electrical contact (e.g., ohmic contact) and to assist phonon transport across the structure. Embodiments of the present disclosure can be designed for a particular application (e.g., thermal interface materials, electrical interconnects, lithium battery anodes, electrochemical catalysts, high frequency, circuits, field emission devices, and the like) by selecting appropriate materials for one or more of the growth substrate 14, the bonding layer 18, and the mating substrate 16.

Carbon nanotubes are cylindrical nanostructures made of carbon. Carbon nanotubes can have an open tubular structure or can be capped at one or both ends of the nanotube. Carbon nanotubes can be single-walled or double-walled. In an embodiment, the layer of carbon nanotubes 12 can have an area packing density of carbon nanotubes of about 2% to 40%. The height of the nanotube can be about 20 to $2.0 \times 10^3$ microns. The diameter between the outer edges of the nanotube can be about 5 to 30 nm. The diameter between the inner edges (tube portion) of the nanotube can be about 2 to 5 nm. The aspect ratio of the carbon nanotubes can be about $2.0 \times 10^3$:3 to $4.0 \times 10^5$:1.

In an embodiment, a portion of the nanotube (e.g., tip on the side opposite the growth substrate 14) can be coated with a material that enhances the bonding of the bonding layer to the nanotubes. The selection of the coating material can depend on the bonding layer material. In an embodiment, the coating material can be a metal such as copper, lead, nickel, gold, tungsten, silver, indium, tin, germanium, gallium, palladium, oxides of any of these, and the like. In an embodiment, the coating material is a material that can bond with a solder that is used as the bonding layer 18.

In an embodiment, the bonding layer 18 is disposed between the layer of nanotubes 12 and the mating substrate 16. The bonding layer 18 can be about a few (about 2 or more) nanometers to hundreds of micrometers thick. As noted above, the bonding layer 18 interacts and covalently bonds with a plurality of the nanotubes of the layer of nanotubes 12. In an embodiment, the bonding layer 18 can be made of materials such as organic molecules, oligomers, polymers, inorganic molecules, or metallic materials (e.g., a solder material). The type of material used as the bonding layer 18 depends upon the type of mating substrate 16 used and the use of the structures 10a or 10b.

In an embodiment the organic molecules function to bond to the nanotubes and the mating substrate 16 using one or more types of functional groups on the organic molecules. The organic molecules should include the appropriate functional group to bond to the nanotubes and the appropriate functional group to bond to the mating substrate 16. In an embodiment, carboxyl acid groups, hydroxyl groups, silanol groups, amine groups, carbene, and nitrene, can each bond with the nanotubes. In an embodiment, —SH groups can be the functional group to bond with gold of mating substrate 14, —SH or —CN groups can be the functional group to bond with silver of mating substrate 14, and carboxyl, carbonyl, and immidazole groups can be the functional group to bond with copper of mating substrate 14. In an embodiment, the organic molecule can include 4-mercaptobenzoic acid, 4-aminothiophenol, oxycarbonyl nitrene, azidothymidine, and a combination thereof. In an embodiment, the bonding layer 18 can be formed from the combination of two or more organic compounds. In an embodiment, the bonding layer 18 can be formed from a mixture of two or more organic compounds so that the bonding layer 18 has functional groups that can bond to both the nanotubes and the mating substrate 16. In an embodiment, the bonding layer 18 can be formed from the sequential addition of organic compounds to the mating substrate 16 to form a bonding layer 18 that has functional groups that can bond to both the nanotubes and the mating substrate 16.

In an embodiment the oligomer and polymer can include functional groups as noted above for the organic groups to serve the same or similar functions. In an embodiment, the oligomer and polymer can include thiol-terminated polyacrylic acid, hydroxyl acid-terminated polyacrylonitrile, thiol-terminated polyaniline, poly(propionylethylenimine-co-ethylenimine), and a combination thereof. In an embodiment, the bonding layer 18 can be formed from the combination of two or more compounds that form the polymer. In an embodiment, the bonding layer 18 can be formed from a mixture of two or more compounds so that the bonding layer 18 has a polymer that has functional groups that can bond to both the nanotubes and the mating substrate 16. In an embodiment, the bonding layer 18 can be formed from the sequential addition of compounds to the mating substrate 16 to form a bonding layer 18 that has a polymer that has functional groups that can bond to both the nanotubes and the mating substrate 16.

In an embodiment the inorganic molecules can include one or more types of functional groups that independently bond to the nanotubes and the mating substrate 16. In an embodiment, —SiH and —SiOH can bond with carbon nanotubes. In an embodiment, the inorganic molecules can include trimethoxylsilane, triethoxylsilane, silicon tetrachloride gamma-aminopropyltrimethoxysilane, and a combination thereof. In an embodiment, the mating substrate 16 can be hydroxyl-terminated silicon, quartz, silicon nitride, and silicon carbide. In an embodiment, the bonding layer 18 can be formed from the combination of two or more inorganic molecules. In an embodiment, the bonding layer 18 can be formed from a mixture of two or more inorganic molecules so that the bonding layer 18 has functional groups that can bond to both the nanotubes and the mating substrate 16. In an embodiment, the bonding layer 18 can be formed from the sequential addition of inorganic molecules to the mating substrate 16 to form a bonding layer 18 that has functional groups that can bond to both the nanotubes and the mating substrate 16.

In an embodiment the metallic bonding layer 18 can include solder materials such as Sn—Bi, Sn—Bi—Ag, Sn—Pb, Sn—Au, Sn—Ag—Cu, Ga, Bi—In—Sn, Sn—In, Al—Si, and the like. In an embodiment a coating material can be used to improve bonding between the carbon nanotubes 12 with the bonding layer 18. The coating material can include titanium, nickel, tungsten, gold, chromium, copper, silver, tin, and a combination thereof.

The mating substrate 16 can be selected to impart a particular function to the structure 10a or 10b. In an embodiment, the mating substrate 16 can be made of materials such as mica, quartz, silicon, copper, silver foil, gold foil, stainless steel, glass, and ceramics. The mating substrate 16 can have a thickness of about a few micrometers to a few millimeters. In an embodiment, the mating substrate 16 has a smooth surface (average surface roughness of 1 nm) for the bonding layer 18 to be disposed on. In an embodiment, the mating substrate 16 can have a rough surface.

The growth substrate 14 can be selected to impart a particular function to the structure 10a. In an embodiment, the growth substrate 14 can be made of materials such as silicon, metal (e.g., copper, stainless steel, high temperature alloys), ceramics (e.g. aluminum oxide), and quartz.

Embodiments of the present disclosure include methods of making structures 10a and 10b. FIGS. 1.2A to 1.2C illustrate a method of forming structure 10a and FIGS. 1.2A to 1.2D illustrate a method of forming structure 10b.

FIG. 1.2A illustrates a first structure 20a and second structure 20b. The first structure 20a includes a growth substrate 14 and a layer of nanotubes 12. The nanotubes can be grown on the growth substrate 14 by a chemical vapor deposition process (e.g., thermal CVD and plasma enhanced CVD). The layer of nanotubes 12 and the growth substrate 14 can include those described herein. The second structure 20b includes a mating substrate 16 and a bonding layer 18. The bonding layer 18 can be formed on the mating substrate 16 using one or more methods such as self-assembly, spin coating, dip coating, bar coating, screen printing and vapor deposition techniques. The mating substrate 16 and the bonding 18 layer can include those described herein.

As shown in FIG. 1.2B, the first structure 20a and the second structure 20b are placed next to one another so that the layer of nanotubes 12 and the bonding layer 18 are opposing one another. FIG. 1.2C illustrates placing the first structure 20a and the second structure 20b adjacent one another so that the layer of nanotubes 14 and the bonding layer 18 are in contact with one another. Subsequently, the first structure 20a and the second structure 20b are heated in a device to a temperature of about 25 to 160° C., about 25 to 200° C., or about 100 to 500° C., depending on the materials used to in the first structure 20a and the second structure 20b.

For example, if the layer of nanotubes 12, growth substrate 14, the bonding layer 18, and mating substrate 16 are vertically aligned carbon nanotubes by a thermal CVD process, surface oxidized silicon, 4-mercaptobenzoic acid, and gold/coated silicon, respectively, the temperature of the device is about 70° C. to 120° C. In another example, if the layer of nanotubes 12, growth substrate 14, the bonding layer 18, and mating substrate 16 are (specific materials) are vertically aligned carbon nanotubes by a thermal CVD process, surface oxidized silicon, trimethoxylsilane/silicon tetrachloride, and —OH terminated silicon substrate, respectively, the temperature of the device is about 25 to 200° C. In another embodiment, if the layer of nanotubes 12, the growth substrate 14, the bonding layer 18, and mating substrate 16 are (specific materials) are vertically aligned carbon nanotubes by a thermal CVD process, surface oxidized silicon, Sn—Pb solder, and copper, respectively, the temperature of the device is about 220° C.

The result of heating of the first structure 20a and the second structure 20b is the formation of structure 10a, where the bonding layer 18 is covalently bonded to a plurality of the nanotubes. Structure 10b can be formed by removing the growth substrate 12. The growth substrate 12 can be removed easily with tweezers, tape, and the like.

EXAMPLES

Example 1

Brief Introduction

As IC performance increases, many technical challenges appear in the areas of current-carrying capacities, thermal management, I/O density, and thermal-mechanical reliability. To address these problems, the use of aligned carbon nanotubes (CNTs) has been proposed in IC packaging for electrical interconnect, and thermal interface materials (TIMs). The theoretical superior electrical, thermal, and mechanical properties of CNTs promise to bring revolutionary improvement by reducing the interconnect pitch size, increasing thermal conductivity, and enhancing system reliability. However, the problems with the CVD growth process such as high growth temperature and poor adhesion of CNTs to substrates, challenge in selectively patterning CNT structures, high contact resistance of CNT/electrodes and damage of CNT wall structure by wet chemical functionalization, become barriers for CNT applications. In order to overcome these disadvantages, we proposed the "chemical anchoring" process to directly attach aligned CNTs onto gold-coated substrates. This methodology has the following features: 1) in-situ functionalization of CNTs with reactive functional groups during CVD process, which preserves the perfect CNT wall structure and good alignment of CNTs as well as controllably tunes the length of functionalized CNTs; 2) covalently bonded interface by employing a self-assembled monolayer (SAM) as the bridging ligand at the CNT-gold substrate interface; 3) low temperature and simple process. Scanning electron microscopy (SEM) was used to characterize the CNT structures. The effectiveness of the in-situ functionalization was characterized by XPS (X-ray photoelectron spectroscopy) and FTIR (Fourier transform infrared spectroscopy). Four-point probe testing system was employed to test the electrical performance of the chemically anchored CNT structure. Results showed an Ohmic contact, low electrical resistivity of the CNT-gold interface structure and improved CNT-substrate adhesion.

Introduction

Carbon nanotubes (CNTs) have attracted much interest due to their extraordinary structural, electrical and mechanical properties, and their wide range of potential applications [1]. For applications in microelectronics or even nanoelectronics, the most interesting features of CNTs are the ballistic transport of electrons and extremely high thermal conductivity along the tube axis [2]. Metallic SWNTs show ballistic conductivity at room temperature [3], enabling CNTs to carry very high currents [4]. Phonons also propagate easily along the nanotubes due to the perfect structure of the CNT [4, 5].

Therefore, CNTs have been proposed as a promising candidate for electrical interconnect material [6, 7].

Generally, the current in a metallic single-walled carbon nanotube (SWCNT) saturates at 20~25 µA [8]; close-ended MWNTs has similar phenomenon because only the outer wall/shell contributes to the current transport [9]. However, multichannel quasiballistic conducting behavior with large current-carrying capacity was found in MWNTs [10]. This implies that CNT conductance and current-carrying capacity will be dramatically improved by integrating open-ended MWNT bundles or arrays which have multichannels in metallic contact with the electrodes.

Closed-ended CNTs prepared by chemical vapor deposition (CVD) traditional have poor adhesion to the substrate. Poor adhesion leads to long term reliability issues and high contact resistance. Moreover, high growth temperature is also incompatible with microelectronic processes. In our previous work, an in-situ open-ended MWCNT growth was achieved by introducing a trace amount of water during CVD growth process [11, 12]. To circumvent the problem of high growth temperature and poor CNT-substrate adhesion, we have developed a CNT transfer process via solder reflow process. Here, we extend our previous approach to a more flexible and rapid process—called a chemical anchoring of CNT to selective substrate. The methodology is featured with the in-situ functionalization of CNT films and large-scale controlled assembly of functionalized CNT films onto chemically modified metal surfaces or pads.

Functionalization of CNTs is used in the chemically anchoring of CNTs onto gold or silicon surfaces [13-20]. However, at present, the CNT functionalization by wet chemical oxidation process not only damages the CNT walls and the array structure, which would undoubtedly affect the electrical and thermal properties of the CNT structure, but also uncontrollably truncate the length of CNTs. Moreover, CNT self-assembly in solution is actually time-consuming and also a random process in terms of the CNT height, position and density. Functionalization of CNT with sidewall protection [21] was reported to retain the ordered structure of CNT film during chemical functionalization of CNT tips. Given the relatively complex process, it may be difficult to be implemented into practical application in microelectronics. In comparison, the in-situ functionalization used here not only functionalized CNT tips with hydroxyl groups during CNT growth but also maintained the alignment and uniform thickness of the CNT film. Furthermore, thiol-treated gold surface/substrate has been widely reported [22, 23]. Conjugated thiol ligand was found to be able to enhance electrical conduction of gold-molecule contact [24]. This inspired us in using thiol as the bridging ligand to form covalently bonded interface between the CNTs and the gold substrate surface. By such interface design, Ohmic contact and multichannel conducting CNTs can be expected. Therefore, this process offers a new paradigm to integrating CNTs onto integrated circuits (ICs) interconnect fabrication or as TIM material for thermal management applications [25]:

Experimental

Synthesis of in-situ Functionalized CNT Films

Water-assisted synthesis of well-aligned open-ended CNT films has been reported in our previous work [12]. Recently, aqueous $H_2O_2$ solution (30 wt. %) was employed as an oxidant instead of $H_2O$ to better in-situ functionalize CNTs during the CVD growth [26]. Here only a brief description of the process is presented. The substrates used were (001) silicon wafers coated with $SiO_2$ (500 nm) formed by thermal oxidation. The support and catalyst layers were $Al_2O_3$ and thin layer Fe, respectively, sequentially deposited onto the substrates by an e-beam evaporation. The CVD growth of CNTs was carried out at 770° C. with ethylene as the carbon source, and hydrogen and argon the carrier gases. Water vapor and oxygen concentrations in the CVD chamber were well controlled by bubbling a small amount of argon gas through an aqueous $H_2O_2$. CNT film thickness was tuned by varying with the growth time. The as-synthesized CNTs were designated as f-CNTs; CNTs grown by the similar method while without in-situ functionalization as p-CNTs (pristine-CNTs).

SAM-Treated Gold Surface

Gold surfaces (150 nm) on silicon wafers were prepared by an e-beam evaporation, using Ti (15 nm) as adhesion layers. The surfaces were rinsed with ethanol, dried, treated with a UV ozone at 0.75 L/min flow rate of the oxygen for 3 minutes and then left in 1 mM ethanol solution of 4-mercaptobenzoic acid (MBA) for 24 hours, under a controlled nitrogen environment. After such treatment, the gold surfaces were rinsed with ethanol to remove non-coordinated MBA molecules and dried with an Argon flow. The MBA reactive functional ligand was then used to treat the MBA-gold surface to introduce carbonyl chloride groups into the SAM structure (MBC-gold).

Chemical Anchoring Process

The chemical anchoring technique is similar to flip-chip technique as illustrated schematically in FIG. 2.1. The as-grown f-CNT film was directly flipped onto the corresponding SAM-treated gold surface and then kept at 110° C. in nitrogen for 4 hours.

Characterization

Morphology observations of the f-CNT firms and chemically anchored CNT films were carried out by scanning electron microscopy (SEM, JEOL 1530) with an operating voltage at 10 kV. Observations of SAM-treated gold surface were performed at 3 kV. Elemental mapping on the SAM-treated gold surface was carried out by a spatially resolved (~1 µm) energy-dispersive spectroscopy (EDS), with a counting time of 5 min.

X-ray photoelectron spectroscopy (XPS) was performed on Model 1600 XPS system equipped with a monochromator Al Kα source was used. High resolution spectra were collected with operating energy of 46.95 eV. The step size and time were 0.025 eV and 100 ms, respectively.

Fourier-transform infrared spectroscopy (FTIR, Nicolet, Magna IR 560) was used to study the in-situ functionalized CNTs (f-CNTs) and their reactions with the functional ligand (designated as s-CNT after the reaction). The samples were properly dried, mixed with KBr and pressed to form the semi-transparent pellets. Spectra were collected in nitrogen at an ambient temperature, by 1000 scans in the wavelength range from 500 to 4000 $cm^{-1}$, at a resolution of ~4 $cm^{-1}$.

Electrical performance testing of the chemically anchored CNT films on the gold surfaces, i.e. the current-voltage (I-V) response of the CNT interconnects, was conducted on A Keithley 2000 multimeter equipped with a four-point probe station. The upper gold electrodes (150 nm, diameter: ~2.1 mm) were deposited on top of the CNT films by an e-beam evaporation. Indeed, SEM examinations of the top gold electrodes confirm that gold only penetrates into the CNT films ~100 nm; therefore, the two electrodes are separated by the CNTs. FIG. 2.2 illustrates a photograph of the four-probe station for electrical property testing of the anchored CNT structure.

Results and Discussion

In-situ Functionalized CNT Films

FIG. 2.3 shows typical side-view SEM images of the as-synthesized f-CNT films, showing well aligned structure and uniform thickness.

XPS scans were carried out on the top of the aligned p-CNT and f-CNT films. FIG. 2.4a is the spectrum of p-CNT, where no oxygen peaks were detected. The symmetric C1s peak of the p-CNTs is centered at 284.5±0.1 eV, assigned to the $sp^2$ hybridized carbons in the graphite structure. In comparison, FIG. 2.4b clearly indicates the existence of oxygen in f-CNTs. The binding energy of the O1s peak is around 529.6 eV, which means that the oxygen does not come from the dissociated (or adsorbed) $H_2O$, since the binding energy of O1s of $H_2O$ is about 533 eV [27]. The asymmetric C1s peak in f-CNT was deconvoluted after background subtraction by the Shirley's method. Both the peaks at 286.3±0.2 and 287.3±0.2 correspond to carbon atoms in C—O [28]. The peaks centered at 285.2±0.2 and 290.0±0.2 eV are due to $sp^3$ carbon atoms and carboxylic acid groups on the aromatic ring, respectively [29], as the background signal was subtracted by the Shirley's method. The XPS results show that the as-synthesized f-CNT walls were in-situ modified with oxygen functional groups.

FIG. 2.5 (trace a) shows the FTIR spectrum of the f-CNTs. The peak at ~1572 cm−1 is attributed to the C=C asymmetric stretching in graphite-like CNT structure. Consistent with XPS results, oxygen related functional groups were found in f-CNTs. Peaks at 3445, 1229, 1179 and 1060 cm−1 are attributed to O—H, C—O, C—O—C and 1° C—OH stretching, respectively. The weak and wide absorption band at ~1730 $cm^{-1}$ is supposed to consist of different carbonyl groups from, for example, carboxylic acid groups and ester groups. The sharp peak at 1647 $cm^{-1}$ is assigned to quinone type units along the side walls of the nanotubes [30]. These oxygen involved functional groups, particularly the hydroxyl groups and the carboxylic acid groups, make f-CNTs reactive with other functional groups. To prove the reactivity, we use the functional ligand material to modify f-CNT. Trace b in FIG. 2.5 shows the FTIR spectrum of the reacted product, s-CNT. Many characteristic peaks in the f-CNTs also appear in the s-CNTs, except the disappearance of the hydroxyl groups at 3445 and 1060 $cm^{-1}$. We postulate that the hydroxyl groups on CNT reacted with the sulfur-containing ligand material to give —C—O—S or even (—C—O—)$_2$S=O. Correspondingly, two new peaks at 1338 and 1070 $cm^{-1}$, both coming from the S=O stretching, appear in s-CNTs. Another feature in the spectrum of s-CNT is the distinct carbonyl groups at 1797 $cm^{-1}$, characteristic of carbonyl chloride groups from the reaction between —COOH and the reactive ligand material. From high resolution transmission electron microscope [31], we believe that more defect structures and thus high reactivity exist at the ends of the f-CNT than along the CNT walls. The electrical property also demonstrates the low defect density of the CNT walls which are consistent with our assumption (see below).

SAM on Gold Surface

The morphology of pristine gold surface is clearly observed both at 10 kV and 3 kV accelerating voltages (FIGS. 2.6a and c). In comparison, only vague image of SAM-gold surface is obtained at 10 kV (FIG. 2.6b) due to instability and relatively low electrical conductivity of the SAMs on surface. However, at 3 kV, which is a typical accelerating voltage for observation of organic molecules, the SMA-gold surface shows a better morphology. Uniform distribution of carbon, sulfur, oxygen and chloride elements were observed by the EDS elemental mapping.

In order to further evaluation of the SAM treatment, water contact angle was tested on the MBA-gold surfaces. For comparison, the water contact angle on the untreated gold surfaces, which were immersed for identical time in the same alcohol solution without addition of MBA, were tested as well. The water contact angle testing was performed on a goniometer (Rame-Hart, Inc.). The diameter of the droplet was about 2 mm. The untreated gold surface gave a water contact angle of 65-70° on average, in comparison with that of 29-33° on the MBA-gold surface. This shows the large-scale adsorption of MBA molecules on the gold surface.

Effectiveness of Chemical Transfer

FIG. 2.7 indicates that the entire f-CNT film was anchored on the substrate with MBA-gold surface, in contrast to the same process wherein the p-CNT film was used. This is because the functionalized f-CNTs reacted with the MBC molecules on the gold surface while there were no reactive functional groups at the tips of p-CNTs. The side view of the anchored CNT structure is observed using an SEM, as shown in FIG. 2.8(a). It can be seen that the aligned structure is well maintained after chemical anchoring. The bended top layer is due to the pressure upon the CNT film during the anchoring process. The as-achieved adhesion between CNT and gold surface is better than that between p-CNT and silicon surface; quantitative characterization of such improvement is being investigated by our group. After removing the anchored CNTs off the gold surface using tweezers, we observe that some anchored CNTs remain at the interface (FIG. 2.8b). This indicates the chemically bonded interface; otherwise, the interface would have shown to be clean without any remaining CNTs.

Electrical Properties of the Chemically Anchored CNTs

FIG. 2.9 shows a typical I-V curve of the chemically anchored CNT structure measured at room temperature. The curve is linear, suggesting that the electrical transport and the contacts are Ohmic. From the I-V curve, the resistance of a compact CNT bundle with a diameter of 2 mm is 0.020Ω. The total resistance can be written as R=R1+R2+R3, where R1 is the top gold electrode/CNT junction resistance, R2 the intrinsic resistance of the CNTs, and R3 the CNT/SAM-gold surface junction resistance. Due to lack of data of R1 and R3, we conservatively estimate the CNT resistivity by neglecting R1 and R3. From the length (~730 µm) and area density (300/µm$^2$) of the CNTs, and the average diameter of CNT (~10 nm, observed and calculated under transmission electron microscope), the resistivity of the individual CNT is estimated to ~2.0±10$^{-4}$ Ω-cm. This value is consistent with literature values [31]. However, considering the dependence of CNT resistivity on the CNT length [32], this value is very small compared to the resistivity of short SWNTs (<10 µm). The measured low resistance of the f-CNT can be attributed to two factors: 1) the ordered structure of the open-ended CNTs and consequently the multichannel electrical transport; 2) relatively low defect density along CNT walls compared with the functionalized CNT by wet chemical method.

Conclusion

An efficient and effective method for in-situ functionalizing CNTs and anchoring CNT films on gold substrate surface was demonstrated. The self-assembly monolayer (MBC) was successfully introduced into the CNT/gold interface as the bridging material. The end opening of CNTs and simultaneously the attaching of functional groups, e.g., hydroxyl groups, is the key to the anchoring of CNTs on substrates by reaction of CNT with a reactive MBC. Ohmic contact and improved adhesion between CNT structure and substrates was achieved. This process is compatible with current microelectronics fabrication sequences and technology by successfully separating the high-temperature CVD growth and low-temperature assembly. Overall, this chemical anchoring technology shows promising applications for positioning CNTs as electrical interconnects or thermal management structures on temperature-sensitive substrates. Characterizations of adhesion strength and thermal conductivity of the anchored structure are in process.

References, for Example 1, Each of which is Incorporated Herein by Reference for the Corresponding Discussion 1. H. J. Dai, J. Kong, C. W. Zhou, N. Franklin, T. Tombler, A. Cassell, S. S. Fan, and M. Chapline, "Controlled chemical routes to nanotube architectures, physics, and devices," Journal of Physical Chemistry B, vol. 103, pp. 11246-11255, December 1999.
2. W. Hoenlein, F. Kreupl, G. S. Duesberg, A. P. Graham, M. Liebau, R. V. Seidel, and E. Unger, "Carbon nanotube applications in microelectronics," Ieee Transactions on Components and Packaging Technologies, vol. 27, pp. 629-634, December 2004.
3. S. Frank, P. Poncharal, Z. L. Wang, and W. A. de Heer, "Carbon nanotube quantum resistors," Science, vol. 280, pp. 1744-1746, June 1998.
4. R. H. Baughman, A. A. Zakhidov, and W. A. de Heer, "Carbon nanotubes—the route toward applications," Science, vol. 297, pp. 787-792, August 2002.
5. P. Kim, L. Shi, A. Majumdar, and P. L. McEuen, "Thermal transport measurements of individual multiwalled nanotubes," Physical Review Letters, vol. 8721, November 2001.
6. A. P. Graham, G. S. Duesberg, R. Seidel, M. Liebau, E. Unger, F. Kreupl, and W. Honlein, "Towards the integration of carbon nanotubes in microelectronics," Diamond and Related Materials, vol. 13, pp. 1296-1300, April-August 2004.
7. F. Kreupl, A. P. Graham, G. S. Duesberg, W. Steinhogl, M. Liebau, E. Unger, and W. Honlein, "Carbon nanotubes in interconnect applications," Microelectronic Engineering, vol. 64, pp. 399-408, October 2002.
8. Z. Yao, C. L. Kane, and C. Dekker, "High-field electrical transport in single-wall carbon nanotubes," Physical Review Letters, vol. 84, pp. 2941-2944, March 2000.
9. P. C. Collins, M. S. Arnold, and P. Avouris, "Engineering carbon nanotubes and nanotube circuits using electrical breakdown," Science, vol. 292, pp. 706-709, April 2001.
10. H. J. Li, W. G. Lu, J. J. Li, X. D. Bai, and C. Z. Gu, "Multichannel ballistic transport in multiwall carbon nanotubes," Physical Review Letters, vol. 95, August 2005.
11. L. B. Zhu, Y. Y. Sun, D. W. Hess, and C. P. Wong, "Well-aligned open-ended carbon nanotube architectures: An approach for device assembly," Nano Letters, vol. 6, pp. 243-247, February 2006.
12. L. B. Zhu, Y. H. Xiu, D. W. Hess, and C. P. Wong, "Aligned carbon nanotube stacks by water-assisted selective etching," Nano Letters, vol. 5, pp. 2641-2645, December 2005.
13. J. J. Gooding, R. Wibowo, J. Q. Liu, W. R. Yang, D. Losic, S. Orbons, F. J. Mearns, J. G. Shapter, and D. B. Hibbert, "Protein electrochemistry using aligned carbon nanotube arrays," Journal of the American Chemical Society, vol. 125, pp. 9006-9007, July 2003.
14. Z. F. Liu, Z. Y. Shen, T. Zhu, S. F. Hou, L. Z. Ying, Z. J. Shi, and Z. N. Gu, "Organizing single-walled carbon nanotubes on gold using a wet chemical self-assembling technique," Langmuir, vol. 16, pp. 3569-3573, April 2000.
15. H. Wei, S. Kim, S. N. Kim, B. D. Huey, F. Papadimitrakopoulos, and H. L. Marcus, "Patterned forest-assembly of single-wall carbon nanotubes on gold using a non-thiol functionalization technique," Journal of Materials Chemistry, vol. 17, pp. 4577-4585, 2007.
16. S, N. Kim, J. F. Rusling, and F. Papadimitrakopoulos, "Carbon nanotubes for electronic and electrochemical detection of biomolecules," Advanced Materials, vol. 19, pp. 3214-3228, October 2007.
17. G. D. Withey, A. D. Lazareck, M. B. Tzolov, A. Yin, P. Aich, J. I. Yeh, and J. M. Xu, "Ultra-high redox enzyme signal transduction using highly ordered carbon nanotube array electrodes," Biosensors & Bioelectronics, vol. 21, pp. 1560-1565, February 2006.
18. L. Sheeney-Haj-Khia, B. Basnar, and I. Willner, "Efficient generation of photocurrents by using CdS/Carbon nanotube assemblies on electrodes," Angewandte Chemie-International Edition, vol. 44, pp. 78-83, 2005.
19. F. Patolsky, Y. Weizmann, and I. Willner, "Long-range electrical contacting of redox enzymes by SWCNT connectors," Angewandte Chemie-International Edition, vol. 43, pp. 2113-2117, April 2004.
20. J. X. Yu, J. G. Shapter, J. S. Quinton, M. R. Johnston, and D. A. Beattie, "Direct attachment of well-aligned single-walled carbon nanotube architectures to silicon (100) surfaces: a simple approach for device assembly," Physical Chemistry Chemical Physics, vol. 9, pp. 510-520, 2007.
21. N. Chopra, M. Majumder, and B. J. Hinds, "Bifunctional carbon nanotubes by sidewall protection," Advanced Functional Materials, vol. 15, pp. 858-864, May 2005.
22. J. M. Beebe, V. B. Engelkes, L. L. Miller, and C. D. Frisbie, "Contact resistance in metal-molecule-metal junctions based on aliphatic SAMs: Effects of surface linker and metal work function," Journal of the American Chemical Society, vol. 124, pp. 11268-11269, September 2002.
23. M. T. Cygan, T. D. Dunbar, J. J. Arnold, L. A. Bumm, N. F. Shedlock, T. P. Burgin, L. Jones, D. L. Allara, J. M. Tour, and P. S. Weiss, "Insertion, conductivity, and structures of conjugated organic oligomers in self-assembled alkanethiol monolayers on Au{111}," Journal of the American Chemical Society, vol. 120, pp. 2721-2732, April 1998.
24. A. V. Tivanski, Y. F. He, E. Borguet, H. Y. Liu, G. C. Walker, and D. H. Waldeck, "Conjugated thiol linker for enhanced electrical conduction of gold-molecule contacts," Journal of Physical Chemistry B, vol. 109, pp. 5398-5402, March 2005.
25. Wei Lin, C P Wong. Invention disclosure, GTID☐ waitint till we get this #)
26. H. J. Jiang, L. B. Zhu, K. S. Moon, and C. P. Wong, "The preparation of stable metal nanoparticles on carbon nanotubes whose surfaces were modified during production," Carbon, vol. 45, pp. 655-661, March 2007.
27. C. D. Wagner, Zatko D. A. and Raymond R. H., "Use of the Oxygen KLL Auger Lines in Identification of Surface Chemical-States by Electron-Spectroscopy for Chemical-Analysis," Analytical Chemistry, vol. 52, pp. 1445-1451, 1980.
28. T. I. T. Okpalugo, P. Papakonstantinou, H. Murphy, J. McLaughlin, and N. M. D. Brown, "High resolution XPS characterization of chemical functionalised MWCNTs and SWCNTs," Carbon, vol. 43, pp. 153-161, 2005.
29. A. Felten, C. Bittencourt, J. J. Pireaux, G. Van Lier, and J. C. Charlier, "Radio-frequency plasma functionalization of carbon nanotubes surface O-2, NH3, and CF4 treatments," Journal of Applied Physics, vol. 98, October 2005.
30. A. Kuznetsova, D. B. Mawhinney, V. Naumenko, J. T. Yates, J. Liu, and R. E. Smalley, "Enhancement of adsorption inside of single-walled nanotubes: opening the entry ports," Chemical Physics Letters, vol. 321, pp. 292-296, April 2000.
31. H. J. Dai, E. W. Wong, and C. M. Lieber, "Probing electrical transport in nanomaterials: Conductivity of individual carbon nanotubes," Science, vol. 272, pp. 523-526, April 1996.

32. C. Gomez-Navarro, P. J. De Pablo, J. Gomez-Herrero, B. Biel, F. J. Garcia-Vidal, A. Rubio, and F. Flores, "Tuning the conductance of single-walled carbon nanotubes by ion irradiation in the Anderson localization regime," Nature Materials, vol. 4, pp. 534-539, July 2005.

Example 2

Brief Introduction

A novel assembling process of incorporating carbon nanotubes as thermal interface materials for heat dissipation has been developed by synthesizing vertically aligned carbon nanotubes on a copper substrate and chemically bonding the carbon nanotubes to a silicon surface. The assembling process and the copper/carbon nanotubes/silicon structure are compatible with current flip-chip technique. The carbon nanotubes are covalently bonded to the silicon surface via a thin but effective bridging layer as a "molecular phonon coupler" at the CNT-silicon interface to mitigate phonon scattering. Experimental results indicate that such an interface modification improves the effective thermal diffusivity of the carbon nanotube-mediated thermal interface by an order of magnitude and conductivity by almost two orders of magnitude. The interfacial adhesion is dramatically enhanced as well, which is significant for reliability improvement of the thermal interface materials.

Introduction

Electronic and photonic devices have been pushed toward faster and higher performance, with increasing demand for heat dissipation [1]. In typical flip-chip assemblies of microprocessors, heat spreaders and heat sinks of high thermal conductivities have been employed to dissipate the heat generated from the die [2]. However, surface asperities greatly limit the actual contact between the solid surfaces (e.g. die/heat spreader and heat spreader/heat sink), undermining the effective thermal conduction. Thermal interface materials (TIMs) have been introduced to fill the gap between the asperities to minimize the thermal contact resistance [3]. TIMs play a key role in developing thermal solutions and have been extensively investigated in the past decades. State-of-the-art commercial TIMs are thermal grease, phase change materials, solders and polymers filled with high thermally conducting fillers, etc. However, none of them meets the heat dissipation requirements of next generation high power devices, which necessitate high performance TIMs with increased thermal conductivity, improved adhesion and higher elastic modulus, identified according to the International Technology Roadmap for Semiconductors [4]. Carbon nanotubes, due to their extremely high intrinsic thermal conductivity and flexibility, have attracted much attention as a promising candidate for next generation TIMs [4-13]. In particular, vertically aligned CNTs (VACNTs) utilize the superior longitudinal thermal conductivity of individual nanotubes and exhibit the overall thermal conductivities of ~80 W $m^{-1} K^{-1}$ or higher [4, 7, 9-13]. Fabrications and characterizations of VACNT TIMs have been a recent research focus. Hu et al. [14] used a 3ω method to test the thermal contact resistance between a 13-μm thick VACNT array and the surface of a free mating substrate.

The results showed that the contact resistances were 17 and 15 $mm^2 K W^{-1}$, respectively, under the pressures of 0.040 and 0.100 MPa. Xu and Fisher [10] synthesized a 10-μm thick VACNT array on silicon and assembled a copper/VACNT/silicon TIM structure. They reported an overall resistance of 19.8 $mm^2 K W^{-1}$ at 0.45 MPa measured by a reference bar method. Zhu et al. [13] used a photothermal technique to measure the contact resistance of a CNT/solder interface. The resistance was large, 43 $mm^2 K W^{-1}$, mainly due to the relatively weak coupling between VACNTs and the solder layer. Cola et al. [4] reported an overall resistance of 16 $mm^2 K W^{-1}$ at 0.241 MPa for a silicon/15-μm VACNT/silver TIM measured by a photoacoustic technique. Resistance reduction was shown when they referred to a two-side TIM structure, in which VACNTs were synthesized on both the copper plate and the silicon substrate before the free CNT tips were mated under compression. Tong et al. [15] grew a 7-μm thick VACNT array on silicon and dry-attached the VACNT/Si to a glass plate. They used a transient phase sensitive photothermal technique to measure the VACNT/glass interfacial resistance to be 11 $mm^2 K W^{-1}$.

In all the work above, there were at least two main issues in common that inhibited real-life applications of these VACNT "TIMs": 1) the thermal contact resistance at the CNT/mating substrate interface was large and dictated the overall thermal resistance of the VACNT TIM [16], even when a relatively high pressure was imposed; 2) the interfacial adhesion was extremely weak. One reason for the large contact resistance is mainly that, according to the very recent report by Panzer, the fraction of CNT-substrate contacts is low [9]. More importantly, in the molecular scale or the atomic scale, the CNTs are not in "contact" with the mating substrate surfaces because there is no chemical bonding or special association, which is also the reason for the weak interfacial adhesion. Thus, a challenge arises as: how can we modify the CNT/mating substrate interface to effectively reduce the thermal contact resistance and simultaneously improve the interfacial adhesion?

In our recent publication, a novel fabrication technique, named "chemical anchoring" has been introduced to significantly reduce the interfacial electrical resistance for VACNT interconnects. [17] However, the molecular coupler that bridged CNTs to the gold surface in ref. 17 could not be transplanted to VACNT TIM assembling here due to its thermal instability (<150° C.) issue and weak interactions with a silicon surface—the mating substrate in the TIM structure of most of the current electronic packaging systems. Here we have adapted the concept of "chemical anchoring" to VACNT TIM assembling by referring to an inorganic cross-linked molecular phonon coupler (MPC) at the interface to facilitate phonon transport across the CNT/silicon interface. The developed VACNT TIM assembling process not only improves the equivalent thermal conductivity of the VACNT TIM by almost two orders of magnitude but also dramatically enhances the interfacial adhesion.

Experimental

VACNT Synthesis

In-situ functionalized VACNT arrays of ~100 μm thick were synthesized on copper plates. Copper plates (1×1 $cm^2$), purchased from Speedy Metals Inc., were polished (average roughness: 0.35-0.42 μm, measured on a Tencor KLA profilometer), cleaned with acetone and isopropanol sequentially, and dried in nitrogen (Airgas) at room temperature. An $Al_2O_3$ layer of 15 nm thick was deposited onto the copper surface by atomic layer deposition, with $Al(CH_3)_3$ (TMA, Sigma-Aldrich) and DI water as the precursors in nitrogen carrier flow. Exposure time in the TMA and the water vapors was 10 s each. The chamber pressure and temperature were kept at ~1.0 Torr and 250° C., respectively. Seated on top of the $Al_2O_3$ layer was a 3-nm thick iron layer deposited by e-beam evaporation. The CVD growth was carried out at 710° C., with the gas flow rate ratio as: $Ar/H_2/C_2H_4$=400/160/130 standard cubic centimeter per minute (sccm). A small amount of Ar was bubbled through 20 wt. % hydrogen peroxide into the furnace chamber during the CVD growth. The as-synthesized CNTs are surface functionalized with oxygen-involved functional groups and have an average diameter of ~20 nm.

TIM Assembling Process

Our TIM assembling process is schematically shown in FIG. 3.1. Trimethoxysilane (TMS, 0.4 ml) was added into anhydrous ethanol (2 ml) followed by sequentially adding aqueous solution of hydrogen chloride (0.08 ml, 1 mol/L) and DI water (0.07 ml). The as-prepared solution was incubated at 45° C. for 24 hours and then fumed with ammonium vapor (15 wt. % ammonium hydroxide from VWR) for 5 minutes. The fumed solution was designated as solution A. Solution B was prepared by adding silicon tetrachloride (0.08 ml) and platinum (0)-1,3-divinyl-1,1,3,3-tetramethydisiloxane complex/xylene solution (0.08 ml, 2 wt. %) into anhydrous xylene (2 ml). Mating substrates (silicon, 1×1 cm$^2$) were surface-treated using a UV& ozone Dry Stripper (SAMCO, model: UV-1) under a 0.75 L min$^{-1}$ flow rate of oxygen for 20 minutes. Solution A and B were sequentially spin-coated onto the silicon substrates at an angular speed of 1000 rad min$^{-1}$ for 5 seconds and 800 rad min$^{-1}$ for 5 seconds, respectively. Then VACNT/copper was immediately flipped onto the mating substrate at a certain pressure (0.5-1.0 MPa). The obtained assembly was treated in a variable frequency microwave chamber (VFM, central frequency: 6.4250 GHz) at 100° C. for 60 min plus at 160° C. for 30 min. Chemicals above were all purchased from Sigma-Aldrich, unless otherwise mentioned.

Hydrosilylation of CNTs

To prove the feasibility of the hydrosilylation of the CNTs (see section Hydrosilylation of CNTs), the solution B (without silicon tetrachloride) was spin-coated onto a single-sided polished silicon substrate. A 100-µm-thick VACNT carpet was pressed onto the as-coated silicon surface and then kept at 100° C. for 60 min plus at 160° C. for 30 min in the VFM chamber with a dried nitrogen protection. After the hydrosilylation reaction, the CNTs were scratched off the silicon surface, dispersed in anhydrous xylene, washed thoroughly with anhydrous xylene and dried in vacuum (~5 kPa, in a nitrogen atmosphere). The obtained products were TMS-CNT adducts.

Characterizations

FT-IR characterizations were performed at ambient temperature with a spectrometer (Nicolet, Magna IR 560) at a resolution of 2 cm$^{-1}$. Solution samples were spin-coated onto double-sided polished silicon substrates and dried in nitrogen at room temperature to evaporate the solvents (drying of the coatings was avoided during the aforementioned TIM assembling process). 64 scans of each specimen were collected. The TMS-CNT adducts (section 2.3) were mixed with dried KBr power and pressed into pellets. 256 scans were collected. Scanning electron microscopy (SEM) was carried out on a JEOL 1530 equipped with a thermally assisted field emission gun operating at 15 kV. The thermal diffusivities of the TIM assemblies (trilayer structures) were measured with a Netzsch laser flash apparatus (LFA447), with no pressure imposed during measurements.

Results and Discussion

The Roles of Solution A and B

A thin layer of MPC was formed on a silicon surface by sequential spin-coating of solution A and B. Solution A undergoes reactions analogous to those involved in a typical silica sol-gel process. The coating of pure trimethoxysilane (TMS) is rather stable, its FT-IR spectrum being shown in FIG. 3.2 (spectrum a). The C—H stretching modes show up at ~2956 and 2846 cm$^{-1}$ and display nearly no changes at elevated temperatures (not shown here). The vibration mode at ~2235 cm$^{-1}$ is attributed to Si—H groups in TMS. Spectrum b in FIG. 3.2 is the spectrum of a coating of acid-treated TMS/ethanol solution, i.e. solution A before fuming in ammonium vapor. The reduction in the vibration intensity ratio of the C—H groups to the Si—H groups in spectrum b, compared with spectrum a, provides evidence of consumption of the methoxy groups. The distinct shift of the main Si—H maximum from 2235 cm$^{-1}$ in spectrum a to 2249 cm$^{-1}$ in spectrum b indicates the loss of neighboring methoxy groups at the silicon atoms and the growth of silane molecules, in other words, sol formation [18]. In the coating of solution A (spectrum c), the shift of the main Si—H maximum to 2254 cm$^{-1}$, the elimination of the C—H stretching, the appearance of a very broad band (3530-3300 cm$^{-1}$) due to silanol groups and a distinct split in the 1200-1000 cm$^{-1}$ range due to Si—O stretching modes, indicate the start of formation of a cross-linked network. The vibration modes at 3057 cm$^{-1}$ and 3157 cm$^{-1}$ are likely due to nitrogen related intermediates [19]. After heat treatment in VFM, disappearance of the nitrogen related intermediates, reduction in the silanol stretching intensity (3530-3300 cm$^{-1}$) and a further split in the 1200-1000 cm$^{-1}$ range are observed in spectrum d and are considered proofs of the network growth. The main purpose of spin-coating of solution B right after the solution A is to bond the Si—H groups in the MPC layer to the CNT surfaces by hydrosilylation reactions, in the presence of the Pt catalyst [20]. Silicon tetrachloride (SiCl$_4$) in solution B plays three significant roles in the TIM assembling. First, SiCl$_4$ is extremely sensitive to moisture; its presence protects the hydrosilylation reactions from being affected by moisture. Second, SiCl$_4$ assists the chemical bonding of the MPC to the CNT surfaces via chemical reactions of silanol groups with the surface carboxylic acid groups and hydroxyl groups on the in-situ functionalized CNTs [21, 22]. Third, the small SiCl$_4$ molecules easily densify the MPC layer after the weakly cross-linked network was formed in the coating of the solution A, by reactions of the highly-reactive Si—Cl groups with the remaining silanol groups.

Hydrosilylation of CNTs

Si—H addition to single-walled carbon nanotubes (SWNTs) has been investigated theoretically and experimentally [20, 23, 24]. In ref. 20, hydrosilylation of pristine SWNTs was studied and it was found that the hydrosilylation was not spatially limited to the CNT ends or its defect sites. It was hypothesized that relief of the torsion strain in the small-diameter SWNTs facilitated the hydrosilylation reaction. It was also thought that larger-diameter tubes would be less reactive due to a smaller degree of π-orbital misalignment and pyramidalization [20, 25]. Hence, the feasibility of hydrosilylation of large-diameter multi-walled carbon nanotubes (MWNTs) seemed questionable. In this study, this feasibility has been proved; the hydrosilylation reaction is the right foundation of the proposed MPC-assisted TIM assembly. FT-IR spectrum of the TMS-CNT adducts in FIG. 3.3 shows the presence of strong C—H stretching at 2962 and 2877 cm$^{-1}$ due to the existence of methyl groups. This indicates the addition of TMS to the CNT surface via, for example, a hydrosilylation reaction. An evidence for the hydrosilylation of CNTs with TMS is the distinct Si—C stretch signal at ~1261 cm$^{-1}$. [20] The hydrosilylation is also evidenced by the presence of C—H stretching from methyne groups at ~2905 cm$^{-1}$. The strong and wide band at 970-1240 cm$^{-1}$ probably consists of C—O stretching, C—O—C stretching and Si—O in-plane vibration [17, 26].

Interface Characterization

Upon spin-coated, the silicon substrate was flipped immediately onto the VACNT grown on a copper plate accompanied by a proper compression force. Chemical reactions at the interfaces proceed in the VFM chamber. Microwave-assisted heating was employed because microwave selectively heats up the silicon substrate, the CNTs and the chemicals at the interfaces [27-29]. In fact, microwave irradiation has attracted much interest in synthetic organic chemistry due to its special role in dramatically increasing reaction rates and the capability of inducing chemical reactions which cannot proceed by thermal heating alone [30-32]. It is postulated that during the VFM treatment, chemical bonding formed between the CNTs and the mating substrate, with the MPC as the bridging agents in between.

In order to have a better observation of the status at the chemically bonded interface, we bonded a VACNT carpet to a MPC-modified silicon substrate without any compression force during the assembling, removed the growth substrate and then peeled part of the bonded VACNTs off the mating substrate. SEM images of the as-prepared interface are shown in FIG. 3.4a-c. The roots of the VACNTs anchored by the MPC at the silicon surface are clearly exposed after the upper parts of the VACNTs are removed. The interfacial strength of the assembly was tested on a die shear tester (Dage series 4000, 10 kg load cell) to be 0.23-0.36 MPa, much stronger than the van der Waals force dominated adhesion (<0.05 MPa) for the pressure contact assemblies (see below). SEM images of the silicon surface after the die shear test are shown in FIG. 3.4d.

Thermal Measurement of the Novel VACNT TIM

The as-described VACNT TIM assembly is referred as the "MPC contact" assembly in the discussions on TIM properties below. We also measured the properties of "loose contact" assemblies and "pressure contact" assemblies. For the "loose contact" assembly, a silicon substrate was placed on top of VACNT/Cu without pressure during assembling or thermal measurements. The "pressure contact" assembly was obtained by compressing a silicon substrate (~0.4 MPa) to VACNT/Cu as in a MPC contact assembly, however, without MPC modifications at the contact interface. The pressure contact assembly was considered almost the same as those that have been reported in the aforementioned literature papers so far [4, 10, 15]. A trilayer model was chosen to numerically fit (with energy loss) the data collected on laser flash equipment. The fitting, with a uncertainty of ~5%, gives an equivalent thermal diffusivity ($\alpha_{TIM}$) of the TIM layer, in which the CNT/Si interface, the CNT/Cu interface and the intrinsic volumetric VACNT array are grouped. FIG. 3.5 shows the measured $\alpha_{TIM}$ values of the loose contact, the pressure contact and the MPC contact assemblies. $\alpha_{TIM}$ of the loose contact assembly is small, ~0.461±0.112 mm$^2$ s$^{-1}$, due to the strong phonon scattering at the sharp and weak CNT/Si interface. The interface modification by MPC improves $\alpha_{TIM}$ by an order of magnitude to ~5.292±0.953 mm$^2$ s$^{-1}$. In comparison, $\alpha_{TIM}$ of the pressure contact assembly shows only limited improvement. Purely imposing pressures during the VACNT TIM assembly or thermal measurement (as performed in refs. 10, 11 and 16 for Example 3) increases the fraction of CNTs in "contact" with the mating substrate. However, these "contacts" are not permanent contacts or bonding in the molecular scale; the separated distance between the CNTs and the substrate surface is in the nanoscale, i.e. the regime where van der Waals forces (attractive forces) dominate [33]. Although it is not recommended that a comparison be made directly among the results measured by different approaches, it is reasonable to believe that the pressure contact assembly in our study is equivalent to those in the aforementioned references because the intrinsic thermal conductivity of the VACNT array and the interface at CNT/substrate upon pressures are more or less the same. In this sense, the MPC contact assembly proposed effectively addresses the issue of reducing the interfacial thermal resistance.

From refs. 4, 10 and 13-15 of Example 3, we note that the equivalent thermal conductivities of the VACNT TIM ($\kappa_{TIM}$, calculated as: $\kappa_{TIM}=L/R_{TIM}$, where L and $R_{TIM}$ are the bond line thickness and the thermal resistance of the TIM, respectively) are smaller than 1 W m$^{-1}$ K$^{-1}$. It does no harm to calculate $\kappa_{TIM}$ values for our TIM assemblies according to the equation: $\kappa_{TIM}=\alpha_{TIM}\times\rho\times c_p$, where $\rho$ and $c_p$ are the measured mass density and the heat capacity, respectively, of the TIM layer in the assembly. The measured densities of the loose contact VACNT TIM, the pressure contact TIM and the MPC contact TIM are 0.073±0.009, 0.435±0.065 and 0.461±0.106 g cm$^{-3}$, respectively. These values are consistent with the theoretical estimations based on the CNT diameter and the surface coverage on the growth substrate [34, 35]. Heat capacity of 0.66 J g$^{-1}$ K$^{-1}$ is used [36]. The calculation results in FIG. 3.5 show dramatic improvement in the equivalent thermal conductivity of the VACNT TIM by MPC contact assembling (1.61±0.47 W m$^{-1}$ K$^{-1}$), compared with the poor conductivity of the loose contact (0.022±0.006 W m$^{-1}$ K$^{-1}$) and the pressure contact (0.306±0.084 W m$^{-1}$ K$^{-1}$) assemblies. The overall equivalent thermal resistance of the MPC contact VACNT TIM is, hence, around 10 mm$^2$ K W$^{-1}$. The uncertainty of $\kappa_{TIM}$ has been estimated using a standard error estimation approach:

$$\frac{\delta\kappa_{TIM}}{\kappa_{TIM}} = \left[\left(\frac{\delta\alpha_{TIM}}{\alpha_{TIM}}\right)^2 + \left(\frac{\delta\rho}{\rho}\right)^2\right]^{0.5} \quad (1)$$

Conclusions

In conclusion, chemical modifications at the VACNT/mating substrate interface by MPC improves the grouped thermal diffusivity of the TIM by one order of magnitude and the equivalent TIM conductivity by almost two orders of magnitude with regard to the bare loose contact at the VACNT/mating substrate interface. It is reasonable to expect a further reduction in the overall thermal resistance when a well-controlled pressure-involved measurement is employed. This remarkable breakthrough undoubtedly provides a real-life VACNT application for thermal management in microelectronic and photonic packaging, and opens up a new field in the design of CNT/substrate interfaces.

References, for Example 3, Each of which is Incorporated Herein by Reference for the Corresponding Discussion

[1] Mahajan R, Chiu C P, Chrysler G. Cooling a microprocessor chip. Proc IEEE 2006; 94(8):1476-86.

[2] Prasher R. Thermal interface materials: Historical perspective, status, and future directions. Proc IEEE 2006; 94(8):1571-86.

[3] Chung D D L. Thermal interface materials. J Mater Eng Perform 2001; 10(1):56-9.

[4] Cola B A, Xu J, Cheng C R, Xu X F, Fisher T S, Hu H P. Photoacoustic characterization of carbon nanotube array thermal interfaces. J Appl Phys 2007; 101(5):054313/1-9.

[5] Berber S, Kwon Y K, Tomanek D. Unusually high thermal conductivity of carbon nanotubes. Phys Rev Lett 2000; 84(20):4613-6.

[6] Baughman R H, Zakhidov A A, de Heer W A. Carbon nanotubes—the route toward applications. Science 2002; 297(5582):787-92.

[7] Huang H, Liu C H, Wu Y, Fan S S. Aligned carbon nanotube composite films for thermal management. Adv Mater 2005; 17(13):1652-3.

[8] Kim P, Shi L, Majumdar A, McEuen P L. Thermal transport measurements of individual multiwalled nanotubes. Phys Rev Lett 2001; 8721(21):215502/1-4.

[9] Panzer M A, Zhang G, Mann D, Hu X, Pop E, Dai H, et al. Thermal properties of metal-coated vertically aligned single-wall nanotube arrays. J Heat Transf-Trans ASME 2008; 130(5):052401/1-9.

[10] Xu J, Fisher T S. Enhancement of thermal interface materials with carbon nanotube arrays. Int J Heat Mass Transf 2006; 49(9-10):1658-66.

[11] Cola B A, Xu X F, Fisher T S. Increased real contact in thermal interfaces: A carbon nanotube/foil material. Appl Phys Lett 2007; 90(9):093513/1-3.

[12] Kordas K, Toth G, Moilanen P, Kumpumaki M, Vahakangas J, Uusimaki A, et al. Chip cooling with integrated carbon nanotube microfin architectures. Appl Phys Lett 2007; 90(12):123105/1-3.

[13] Zhu L B, Hess D W, Wong C P. Assembling Carbon Nanotube Films as Thermal Interface Materials. 57th Electronic Components and Technology Conference. Reno, (Nevada, USA): IEEE 2007; 2006-10.

[14] Hu X J, Padilla A A, Xu J, Fisher T S, Goodson K E. 3-omega measurements of vertically oriented carbon nanotubes on silicon. J Heat Transf-Trans ASME 2006; 128(11):1109-13.

[15] Tong T, Zhao Y, Delzeit L, Kashani A, Meyyappan M, Majumdar A. Dense, vertically aligned multiwalled carbon nanotube arrays as thermal interface materials. IEEE Trans Compon Packaging Technol 2007; 30(1):92-100.

[16] Son Y, Pal S K, Borca-Tasciuc T, Ajayan P M, Siegel R W. Thermal resistance of the native interface between vertically aligned multiwalled carbon nanotube arrays and their SiO2/Si substrate. J Appl Phys 2008; 103(2):024911/1-7.

[17] Lin W, Xiu Y G, Jiang H J, Zhang R W, Hildreth O, Moon K S, et al. Self-assembled monolayer-assisted chemical transfer of in situ functionalized carbon nanotubes. J Am Chem Soc 2008; 130(30):9636-7.

[18] Marrone M, Montanari T, Busca G, Conzatti L, Costa G, Castellano M, et al. A Fourier transform infrared (FTIR) study of the reaction of triethoxysilane (TES) and bis[3-triethoxysilylpropyl]tetrasulfane (TESPT) with the surface of amorphous silica. J Phys Chem B 2004; 108(11):3563-72.

[19] Everhart J B, Ault B S. Infrared Spectroscopic Study of the Cryogenic Thin-Film and Matrix-Isolated Complexes of Ticl4 with Nh3 and (Ch3)(3) N. Inorg Chem 1995; 34(17):4379-84.

[20] Hemraj-Benny T, Wong S S. Silylation of single-walled carbon nanotubes. Chem Mat 2006; 18(20):4827-39.

[21] Vast L, Philippin G, Destree A, Moreau N, Fonseca A, Nagy J B, et al. Chemical functionalization by a fluorinated trichlorosilane of multi-walled carbon nanotubes. Nanotechnology 2004; 15(7):781-5.

[22] Velasco-Santos C, Martinez-Hernandez A L, Lozada-Cassou M, Alvarez-Castillo A, Castano V M. Chemical functionalization of carbon nanotubes through an organosilane. Nanotechnology 2002; 13(4):495-8.

[23] Chu Y Y, Su M D. Theoretical study of addition reactions of carbene, silylene, and germylene to carbon nanotubes. Chem Phys Lett 2004; 394(4-6):231-7.

[24] Lu X, Tian F, Zhang Q R. The [2+1] cycloadditions of dichlorocarbene, silylene, germylene, and oxycarbonylnitrene onto the sidewall of armchair (5, 5) single-wall carbon nanotube. J Phys Chem B 2003 A;107(33):8388-91.

[25] Niyogi S, Hamon M A, Hu H, Zhao B, Bhowmik P, Sen R, et al. Chemistry of single-walled carbon nanotubes. Accounts Chem Res 2002; 35(12):1105-13.

[26] Lin W, Wang C A, Le H L, Long B, Huang Y. Special assembly of laminated nanocomposite that mimics nacre. Mater Sci Eng C-Biomimetic Supramol Syst 2008; 28(7):1031-7.

[27] Imholt T J, Dyke C A, Hasslacher B, Perez J M, Price D W, Roberts J A, et al. Nanotubes in microwave fields: Light emission, intense heat, outgassing, and reconstruction. Chem Mat 2003; 15(21):3969-70.

[28] Paton K R, Windle A H. Efficient microwave energy absorption by carbon nanotubes. Carbon 2008; 46(14):1935-41.

[29] Gibson R F, Ayorinde E O, Wen Y F. Vibrations of carbon nanotubes and their composites: A review. Compos Sci Technol 2007; 67(1):1-28.

[30] Kappe C O. Controlled microwave heating in modern organic synthesis. Angew Chem-Int Edit 2004; 43(46):6250-84.

[31] Jiang H J, Moon K S, Zhang Z Q, Pothukuchi S, Wong C P. Variable frequency microwave synthesis of silver nanoparticles. J Nanopart Res 2006; 8(1):117-24.

[32] Lin W, Moon K S, Wong C P. A Combined Process of In-Situ Functionalization and Microwave Treatment to Achieve Ultra-Small Thermal Expansion of Aligned Carbon Nanotube/Polymer Nanocomposites: toward Applications as Thermal Interface Materials. Adv Mater 2009; 21(23): 2421-24.

[33] Qu L, Dai L. Gecko-foot-mimetic aligned single-walled carbon nanotube dry adhesives with unique electrical and thermal properties. Adv Mater 2007; 19(22):3844-5.

[34] Zhu L B, Sun Y Y, Hess D W, Wong CP. Well-aligned open-ended carbon nanotube architectures: An approach for device assembly. Nano Lett 2006; 6(2):243-7.

[35] Futaba D N, Hata K, Yamada T, Hiraoka T, Hayamizu Y, Kakudate Y, et al. Shape-engineerable and highly densely packed single-walled carbon nanotubes and their application as super-capacitor electrodes. Nat Mater 2006; 5(12):987-94.

[36] Hone J, Batlogg B, Benes Z, Johnson A T, Fischer J E. Quantized phonon spectrum of single-wall carbon nanotubes. Science 2000; 289(5485):1730-3.

Example 3

A VACNT film (30~3000 micon) can be synthesized on a Si growth substrate by a thermal CVD process (See FIG. 4.1). The VACNT film can be a continuous film or a patterned film. Patterning of the VACNT film can be achieved by patterning of the catalyst via a lift-off process or an interference laser ablation process, or by interference laser ablation of CNTs after the continuous film is synthesized. The synthesized VACNT film surface is metalized with Ti (50-100 nm)\Ni (100-300 nm)\Au (150-300 nm). The as-metallized VACNTs are bonded to a copper surface or a metalized silicon surface with Bi—Sn solder materials at proper reflow temperatures. The as-assembled structure can have an overall thermal resistance as low as 10 $mm^2$ K/W.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

Therefore, the following is claimed:

1. A method of forming a structure, comprising:
    positioning a first structure adjacent a second structure, wherein
        the first structure includes a top side and a bottom side, wherein the top side includes a layer of carbon nanotubes,
        the second structure includes a top side and a bottom side, wherein the top side includes a bonding layer,
        wherein the top side of each of the first structure and the second structure are adjacent to one another so that the layer of carbon nanotubes contacts the bonding layer;
    heating the first structure and the second structure in a device; and
    forming a third structure from the first structure and the second structure wherein a plurality of the carbon nanotubes are covalently bonded to the bonding layer.

2. The method of claim 1, wherein the bonding layer is an organic molecule.

3. The method of claim 1, wherein the first structure includes a growth substrate adjacent the layer of carbon nanotubes.

4. The method of claim 3, wherein the growth substrate is made of a material chosen from silicon, a metal, a ceramic, and quartz.

5. The method of claim 3, further comprising removing the growth substrate from the third structure.

6. The method of claim 1, wherein the second structure includes a mating substrate adjacent the bonding layer.

7. The method of claim 6, wherein the mating substrate includes a metal layer having the bonding layer disposed on the metal layer.

8. The method of claim 6, wherein the mating substrate is made of a material chosen from mica, quartz, silicon, copper, silver, gold, stainless steel, glass, and ceramic.

9. The method of claim 1, wherein heating includes heating the first structure and the second structure to a temperature in the device of about 25 to 160° C.

10. The method of claim 1, wherein heating includes heating the first structure and the second structure to a temperature in the device of about 25 to 200° C.

11. The method of claim 1, wherein heating includes heating the first structure and the second structure to a temperature in the device of about 100 to 500° C.

12. The method of claim 1, wherein the aspect ratio of each carbon nanotube is about $2.0 \times 10^3:3$ to $4.0 \times 10^5:1$.

* * * * *

UNITED STATES PATENT AND TRADEMARK OFFICE
CERTIFICATE OF CORRECTION

PATENT NO. : 8,702,897 B2
APPLICATION NO. : 12/800934
DATED : April 22, 2014
INVENTOR(S) : Wei Lin and Ching Ping Wong It is certified that error appears in the above-identified patent and that said Letters Patent is hereby corrected as shown below:

In the Specification

Column 6, line 20: replace "mating substrate 14" with – mating substrate 16

Column 6, line 22: replace "mating substrate 14" with – mating substrate 16

Column 6, line 24: replace "mating substrate 14" with – mating substrate 16

Signed and Sealed this
Thirty-first Day of March, 2015

Michelle K. Lee
*Director of the United States Patent and Trademark Office*